United States Patent
Titschert et al.

(10) Patent No.: US 7,872,846 B2
(45) Date of Patent: *Jan. 18, 2011

(54) PROTECTIVE CIRCUIT FOR INTRINSICALLY SAFE ELECTRO-MAGNETIC ACTUATORS, AND PROTECTIVE CIRCUIT FOR INTRINSICALLY SAFE ENERGY SUPPLY SYSTEMS

(75) Inventors: Jens Titschert, Lünen (DE); Achim Sondermann, Haltern (DE)

(73) Assignee: Bucyrus Europe GmbH, Lunen (DE)

( * ) Notice: Subject to any disclaimer, the term of this patent is extended or adjusted under 35 U.S.C. 154(b) by 302 days.

This patent is subject to a terminal disclaimer.

(21) Appl. No.: 11/341,112

(22) Filed: Jan. 27, 2006

(65) Prior Publication Data

US 2006/0181156 A1 Aug. 17, 2006

(30) Foreign Application Priority Data

Jan. 31, 2005 (DE) .................. 10 2005 004 554

(51) Int. Cl.
*H01H 47/00* (2006.01)

(52) U.S. Cl. .................. 361/166; 361/160; 361/167; 307/130

(58) Field of Classification Search .............. 361/93.1, 361/160, 166, 167; 307/130
See application file for complete search history.

(56) References Cited

U.S. PATENT DOCUMENTS

| | | | | |
|---|---|---|---|---|
| 4,178,619 A | * | 12/1979 | Seiler et al. .............. | 361/91.6 |
| 4,503,480 A | * | 3/1985 | Pickard et al. ............. | 361/152 |
| 4,706,158 A | * | 11/1987 | Todaro et al. .............. | 361/92 |
| 4,740,202 A | * | 4/1988 | Stacey et al. ............... | 604/119 |
| 5,508,874 A | * | 4/1996 | Williams et al. ............ | 361/92 |
| 5,806,522 A | * | 9/1998 | Katims ...................... | 600/554 |
| 6,105,192 A | * | 8/2000 | Deiterman et al. .......... | 15/50.1 |
| 6,137,192 A | * | 10/2000 | Staffiere ..................... | 307/130 |
| 6,693,411 B2 | * | 2/2004 | Bub et al. .................... | 323/282 |

(Continued)

FOREIGN PATENT DOCUMENTS

JP 63003689 * 1/1988

OTHER PUBLICATIONS

Paul Horowitz, The Art of Electronics, 2006, The Press Syndicate of the University of Cambridge, Second Edition, 229-230.*

*Primary Examiner*—Stephen W Jackson
*Assistant Examiner*—Tien Mai
(74) *Attorney, Agent, or Firm*—Cook Alex Ltd.

(57) ABSTRACT

A protective circuit (30) for intrinsically safe electromagnetic actuators operating at the voltage of a power supply approved for underground mining, for switching electrohydraulic valves in underground mining, comprising a coil (11) connected to a first potential (2) and a second potential (3) of the power supply and associated with at least two spaced apart short-circuit means (12) connected in parallel with the electromagnetic actuator coil (11) for short-circuiting ting the coil in the event of a reversal of the potential of the coil voltage. In accordance with the present invention the protective circuit comprises a semiconductor switch (T3) which is inserted between the coil (11) and the second potential (3) and, in the event of a voltage reduction or potential reversal, isolates the coil (11) from the second potential, so that the discharge from the coil (11) has no adverse effect on the energy supply system or the intrinsic safety.

15 Claims, 2 Drawing Sheets

U.S. PATENT DOCUMENTS 6,996,389 B2 * 2/2006 Fitzpatrick et al. ....... 455/343.1
2002/0154524 A1 * 10/2002 Yamanaka et al. ............ 363/59
2003/0160200 A1 * 8/2003 Suilmann et al. ....... 251/129.18

* cited by examiner

US 7,872,846 B2

PROTECTIVE CIRCUIT FOR INTRINSICALLY SAFE ELECTRO-MAGNETIC ACTUATORS, AND PROTECTIVE CIRCUIT FOR INTRINSICALLY SAFE ENERGY SUPPLY SYSTEMS

CROSS-REFERENCE TO RELATED APPLICATION

This patent application claims a right of priority to German patent application Serial No. 102005004554.5 filed on Jan. 31, 2005.

FIELD OF THE INVENTION

The present invention relates to a protective circuit for intrinsically safe electromagnetic actuators operating at the voltage of a power supply approved for underground mining, for switching electrohydraulic valves in underground mining, comprising a coil connected to a first potential and to a second potential of the power supply and associated with at least two spaced-apart short-circuit means connected in parallel with the electromagnetic actuator coil for short-circuiting the coil in the event of a reversal of the potential of the coil voltage.

The present invention also relates to a protective circuit for intrinsically safe underground energy supply systems comprising a number of electronic control units connected to the supply lines of a common power supply approved for underground mining, for actuating respective electromagnetic actuators connected to the control units and operating at the power supply voltage for switching electrohydraulic valves in underground mining, wherein each electromagnetic actuator coil connected to a first potential and a second potential of the power supply is connected in parallel with at least one short-circuit means for short-circuiting the coil in the event of a reversal of potential of the coil voltage.

BACKGROUND OF THE INVENTION

In underground mining the hydraulic operations, usually effected via hydraulic cylinders or hydraulic props, are initiated by a number of electromagnetic actuators for switching electrohydraulic valves for the hydraulic cylinders. The large number of electrohydraulic valves for switching, for example in powered shield-type walking supports, place especially exacting requirements on the power supplies and the available underground energy supply system, and furthermore both the power supply and the energy supply systems must be intrinsically safe and meet all the requirements regarding protection from explosions and/or other forms of ignition. Since this involves limiting the installed electric loads made available by the power supply, it is conventional in underground mining to provide the electromagnetic actuators with holding-current lowering means. Also the large inductive loads in the intrinsically safe energy supply systems make it necessary to take special precautions to ensure conformity with the anti-ignition regulations.

One known problem in the case of electromagnetic actuators with energised coils is the residual energy pulse after cutting off the inductive load. As a counter-measure in existing underground mining, all electromagnetic actuators are provided with at least two short-circuit means usually in the form of free-wheeling diodes, which short-circuit the coil in the event of a reversal of potential of the coil voltage, in order in all cases to avoid voltage peaks of the cut-off energy or of the residual energy pulse. The magnetic field, which collapses when the coil is switched off, induces a voltage in the coil, with the opposite polarity from the connected voltage, and this polarity change, hereinafter referred to by the general term "potential reversal", unlocks the freewheeling diode so that a current flows through it for dissipating the magnetic field of the coil.

However, in underground energy supply systems comprising a number of simultaneously switched electromagnetic actuators, the residual cut-off energy pulse resulting for example from a broken cable or the like, even if reduced by freewheeling diodes, will result in a total pulse beyond that permitted by the anti-ignition regulations.

An aim of the invention is to devise a protective circuit for electromagnetic actuators or for intrinsically safe underground energy supply systems wherein even under the most unfavourable conditions such as a broken cable or power failure, there is no possibility of an overall pulse resulting in gas ignition or other operating states not permitted by the anti-ignition regulations.

SUMMARY OF THE INVENTION

Accordingly a first aspect of the present invention is directed to a protective circuit for intrinsically safe electro magnetic actuators as described in the opening paragraph of the present specification wherein a protective circuit for intrinsically safe electromagnetic actuators operating at the voltage of a power supply approved for underground mining, for switching electrohydraulic valves in underground mining, comprising a coil connected to a first potential and to a second potential of the power supply and associated with at least two spaced-apart short-circuit means connected in parallel with the electromagnetic actuator coil for short-circuiting the coil in the event of a reversal of the potential of the coil voltage, wherein a semiconductor switch inserted between the coil and the second potential and isolating the coil from the second potential in the event of a voltage reduction or potential reversal.

In accordance with the invention, in the event of irregularities such as an excessive voltage reduction or potential reversal, a semiconductor switch which is permanently switched on under normal conditions or in the starting state and permits a flow of current prevents any of the energy stored in the coils from flowing back into the supply lines or potential leads of the power supply or of the underground energy supply system. The coils are disconnected from the second potential in order to prevent the inductive load of the coils from affecting the total energy supply system. The inductive loads are then discharged and dissipated by the short-circuit means (which, in known manner, can comprise especially freewheeling diodes), without adversely affecting the intrinsic safety of the electromagnetic actuator or of the entire energy supply system.

In an example embodiment, the semiconductor switch can be connected in series with the short-circuit means and the coil and isolates both of them from the second potential of the power supply.

Advantageously in that case, the semiconductor switch is a transistor, especially a field-effect transistor, having its base or gate connected to the first potential.

In underground mining, the second voltage is usually the earth potential and the first potential is for example 12V. When the earth (GND) potential is externally switched off, the coil begins to discharge. The discharge occurs via the parallel-connected short-circuit means, for example especially one or more freewheeling diodes. Owing to the voltage drop via the freewheeling diodes, the voltage on the coil side, which is normally connected to earth potential, becomes greater than the voltage on the 12 V side. Since the switched-through channel of the transistor is no longer at zero potential, since it is disconnected from earth potential, the voltage at the drain and source or emitter and collector contacts of the transistor (the semiconductor switch) is raised to the electric potential from the said side of the coil, which is higher for example than the 12 V supply. Since the gate or base voltage of the transistor is also connected to the 12 V side, the transistor automatically blocks the flow of current. Consequently the stored energy of the coil cannot reach the outer connections of the electromagnetic actuator and thus has no effect on the connected energy supply system.

Preferably, the semiconductor circuit can be actuated by a detecting circuit connected in parallel with the coil for detecting the potential reversal or the voltage reduction.

Advantageously the detecting circuit comprises an operational amplifier, especially a comparator, whereby in the event of a potential change or if a threshold is exceeded at the inputs of the comparator or operational amplifier, the semiconductor switch is actuated in order to isolate the coil from the second potential.

Preferably, the semiconductor switch is preferably a transistor, especially a field-effect transistor, having its base or gate connected to the input of the operational amplifier. The comparator is used for early recognition or detection of the moment when the polarity of the coil is reversed, the said polarity reversal being caused by external disconnection from the earth, in which case the protected circuit continues to use a transistor which is permanently switched on and permits a flow of current in order to disconnect the coil from earth potential at the right moment and thus prevent the stored internal energy of the magnetic coil from reaching the external connections of the solenoid valve and discharges it through the parallel-connected freewheeling diodes or the like. Instead of the polarity reversal, a disproportionate or excessive reduction in voltage may be detected, for example beyond the comparator threshold.

Advantageously, the protective circuit comprising the operational amplifier or comparator comprises a separate energy supply for the detecting circuit in the form of an energy buffer storage which is charged when the coil is energised at the power supply voltage. The buffer energy storage which charges when the electromagnetic coil is actuated, supplies energy to the detector circuit even when the power supply voltage fails and the coil is discharged via the short-circuit means.

Preferably the energy buffer storage can more especially comprise a capacitor.

Inter alia in accordance with the invention, each individual electromagnetic actuator can be associated with a protective circuit in accordance with the invention, in which case this will require renewal or retrofitting of all the electromagnetic actuators in the underground system.

Accordingly, a second aspect of the present invention is directed to a protective circuit for intrinsically safe energy supply systems as described in the second paragraph of the present specification wherein protective circuit for intrinsically safe underground energy supply systems comprising a number of electronic control units connected to the supply lines of a common power supply approved for underground mining, for actuating respective electromagnetic actuators connected to the control units and operating at the power supply voltage for switching electrohydraulic valves in underground mining, wherein each electromagnetic actuator coil connected to a first potential and a second potential of the power supply is connected in parallel with at least one short-circuit means for short-circuiting the coil in the event of a reversal of the coil potential, in which each control unit is associated with a protective circuit comprising a semiconductor switch which is inserted between the second potential and the coils associated with the said control unit and which isolates the said coils from the second potential in the event of a voltage reduction or potential reversal.

Advantageously the semiconductor switch is connected to the voltage of the capacitor or the like chargeable with the power supply voltage, so as to maintain the voltage difference necessary for switching the semiconductor switch in the event of a potential reversal at least one of the coils.

Another fundamental problem with underground mining is the limited available capacity of the power supply. For example in power supplies permitted in Germany, the maximum available current is limited to about 2.2 amps whereas 8-amp power supplies are permitted in the USA. In order nevertheless to be able to connect a power supply to a plurality of electronic control units for actuating the electromagnetic actuators, advantageously a current limiting circuit is associated with each electronic control unit. The current limiting circuit can be incorporated for example in the electronic control unit, optionally in the form of an intelligent valve-actuating strip or rail or the like.

Preferably, the current-limiting circuit comprises a monitoring circuit which, on reaching a said instantaneous current consumption, actuates the or a semiconductor switch in order to isolate the second potential from all coils monitored by the monitoring circuit.

Advantageously the semiconductor switch for the current-limiting circuit is also the semiconductor switch of the circuit for cutting off the second potential. Preferably, the monitoring circuit can comprise an operational amplifier, especially a comparator, which in the event of a change in the potential at the inputs of the operational amplifier, activates the semiconductor switch in order to cut off the voltage and current supply to all coils.

Preferably, the semiconductor switch can more especially comprise a transistor, advantageously a field-effect transistor (FET).

In an advantageous embodiment of the invention the output of the operational amplifier and of the capacitor can be connected to the base or gate of the semiconductor switch.

Preferably, the second potential is the earth potential of the power supply or energy supply system and the semiconductor circuit electronically isolates from earth potential since, in all devices used in underground mining, all intentional external switching operations are performed on the earth connection.

Advantageously, the short-circuit means also comprises freewheeling diodes.

BRIEF DESCRIPTION OF THE DRAWINGS

Examples of protective circuits made in accordance with the invention will now be explained with reference to the accompanying drawings, in which.

DESCRIPTION OF THE PREFERRED EMBODIMENTS

Figure 1:
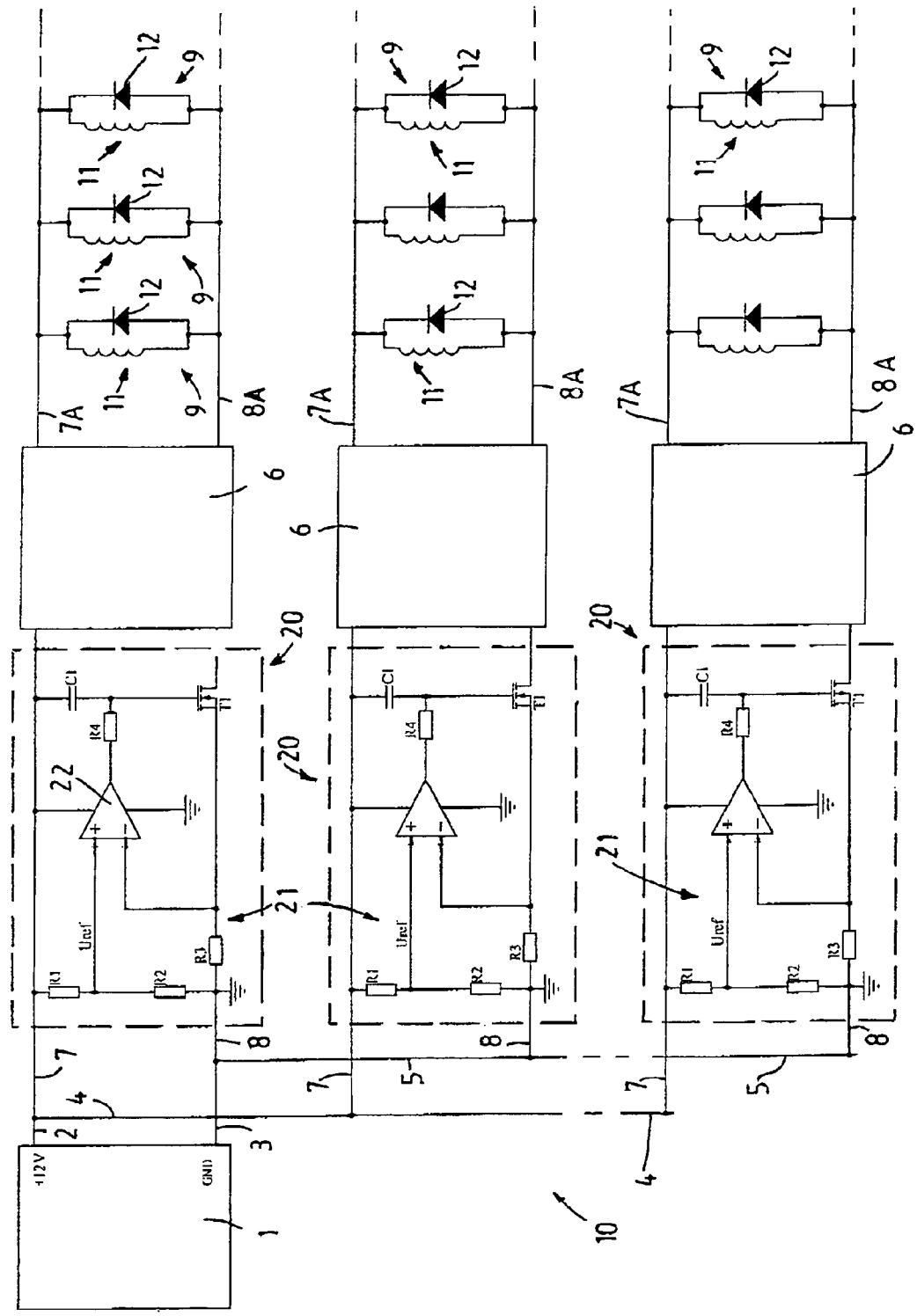
FIG. 1 shows a circuit diagram of an underground energy supply system for electronic control units connected to conventional electromagnetic actuators and to a protective circuit associated with each control unit.

FIG. 1 shows a diagrammatic representation of an intrinsically safe underground energy supply 10 system in a circuit diagram. The energy supply system 10 comprises an intrinsically safe power system 1 approved for operation in underground mining and in the form of a 12 V DC source at a first potential 2 of +12 V and a second potential 3 embodied by an earth conductor, hereinafter called earth potential. The first or 12 V potential 2 and the second or earth potential 3 are supplied by respective branch lines 4 and 5, respective supply lines 7, 8 each leading to an electronic control unit 6, and potential lines 7A, 8A to all the loads 9 in the underground energy supply system 10. The loads in this case are a plurality of conventional electrohydraulic valves 9 connected to each electronic control unit 6, wherein each electrohydraulic valve 9 comprises an inductive load and an electromagnetic actuator in the form of a coil 11 and at least one freewheeling diode 12 connected in parallel with the coil 11 as a means for short-circuiting the said coil 11. A number of electromagnetic control units 6 are also connected in parallel to each power supply 1 in the energy supply system 10, in each case via the supply lines 7 and 8. The coils 11 of all the electromagnetic valves 9 are so connected via the potential lines 7A, 8A to the supply lines 7, 8 that each coil 11, depending on the switching gate for example in the electronic control unit 6, is briefly supplied with the full voltage of the power supply 1, that is the voltage between the 12 V potential 2 and the earth potential 3 in order to control and alter the switching state of the electromagnetic actuator of the electronic valve 9 by magnetizing the coil 11. Of course, at least one separate potential line 7A, 8A is provided for each coil. Since this is known to the person skilled in electromagnetic actuators, it will not be further referred to here.

Each electronic control unit 6, which can also comprise or contain an intelligent valve-actuating strip, rail or the like, is connected to a number of electrohydraulic valves 9 and coils 11, the number depending on the intrinsic safety of the power supply 1 and the energy supply system 10. The permitted number is determined by the maximum permissible inductive load on all coils 11 of the electromagnetic actuators. In accordance with the invention each said electronic control unit 6 is associated with a protective circuit 20 which in the present case comprises a transistor T1 in the form of a field effect transistor FET which is so inserted in the supply line 8 connected to the earth potential 3 of the power supply 1 that it lies between the earth-potential side connections of the coil 11 and the said earth potential 3 of the power supply or energy supply system 10. In the example embodiment shown, each protective circuit 20 is disposed between the electronic unit 6 and the power supply 1 and is associated with the supply lines 7 and 8. In the example embodiment shown, the protective circuit 20 also comprises a current-limiting circuit (general reference 21) containing a comparator 22 constituting the main component of a monitoring circuit which actuates the gate of the transistor T1 so as to serve as a current-limiting circuit 21. By means of a simple voltage divider in the form of resistors R1 and R2, a reference voltage $U_{ref}$ is applied to one input of the comparator 22, whereas at the other input of the comparator 22 there is a voltage drop caused by a resistor R3 inserted into the supply line 8 connected to earth potential. The voltage drop in the earth potential at the resistor R3 depends on the power consumption of all the instantaneously switched coils 11 associated with the control unit 6. If the voltage drop at the resistor R3 exceeds the reference voltage $U_{ref}$ at the other input of the comparator 22, the transistor T1 is actuated via the interposed resistor R4 so that the transistor T1 switches off the current flowing through the supply line 8. This ensures that the number of electrohydraulic valves 9 connected to a control unit 6 is not more than the maximum which can be simultaneously connected while still being intrinsically safe in operation. If the control unit 6 tries to switch on more coils 11 or electromagnetic actuators at the same time, the entire load is switched off by the transistor T1. The protective circuit 20 comprising the current-limiting circuit 21 thus ensures that only an intrinsically safe number of magnetic coils 11 per protective circuit 20 can be switched on at any one time.

The transistor T1 also ensures that each group of units protected by the current-limiting circuit 21 of a protective circuit 20 with regard to its power consumption cannot discharge its inductive loads to the energy supply system 10 if accidentally or externally switched off, since the resulting operating state may be impermissible as regards intrinsic safety. This result is ensured by the said transistor T1 and the capacitor C1 connected to the gate of the transistor T1. At the moment when the earth connection 8 is broken between the transistor T1 and the power supply 1, the voltage potential, owing to the voltage stored in the coils 11 on the side of the coils 11 previously connected to the earth potential 3, will rise to a value appreciably above the 12 V potential 2 of the power supply. At that moment the capacitor C1 connected to the gate control of the switching-off transistor T1 maintains the previous voltage difference for a short time and thus depresses the gate voltage of the field effect transistor T1 below the higher electric potential at its drain and source connections. The transistor T1 thus automatically isolates the coils 11 of the electrohydraulic valves 9 downstream of the respective protective circuit 20 from the external connections or lines 7, 8 or 4, 5 of the energy supply system, so that there can be no further effect on any part of the connected energy supply system 10. The protective circuit 20, comprising the current-limiting circuit 21 and the isolating transistor T1, can therefore in principle operate any required number of protected groups of units in parallel with an intrinsically safe power supply 1. Once the transistor T1 is switched off, however, it cannot be switched on again until a connection has again been made to the earth potential 3 of the power supply 1.

The protective circuit 20 described with reference to FIG. 1 is especially useful when the energy supply system 10 comprises electromagnetic valves 9 with conventional electromagnetic actuators, that is wherein each coil 11 is associated with at least one short-circuit means in the form of a freewheeling diode 12 or the like. Owing to the redundancy requirements on underground mining, each coil 11 is normally associated with at least two freewheeling diodes 12.

Figure 2:
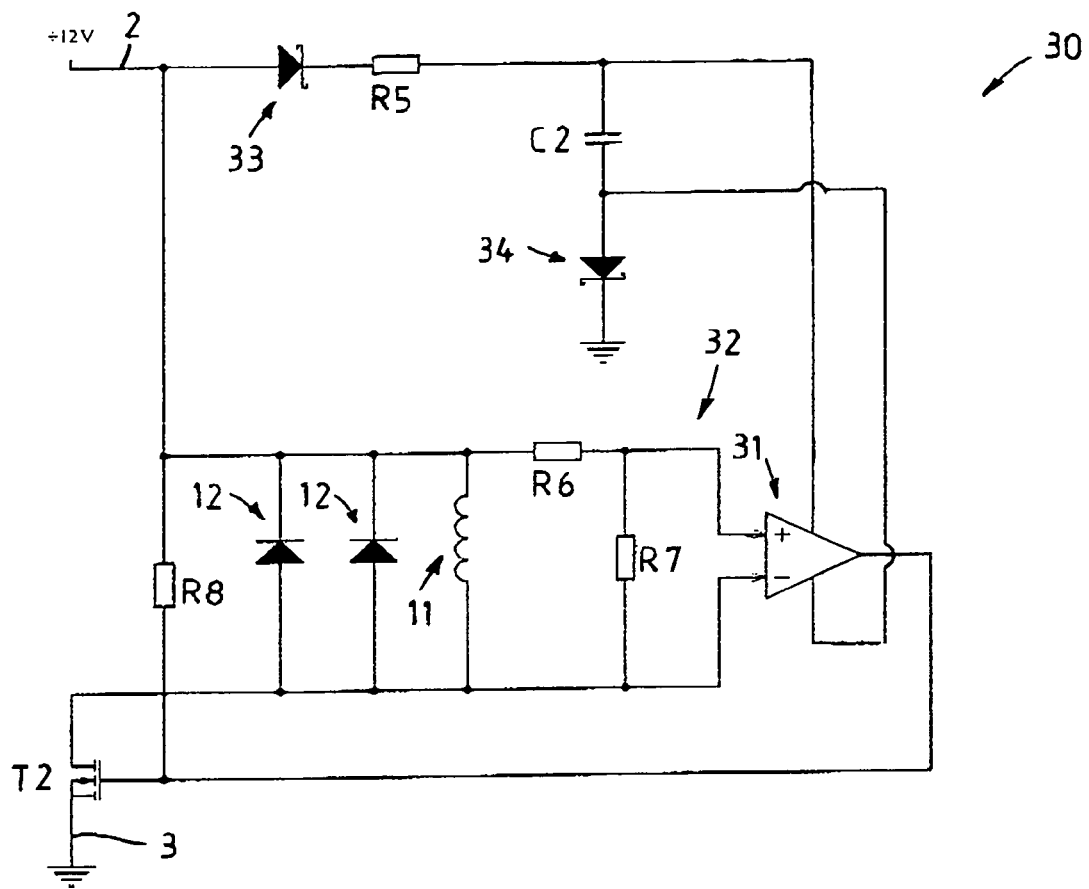
FIG. 2 shows a protective circuit for each coil of an electromagnetic actuator for underground mining in accordance with a first example embodiment.
Figure 3:
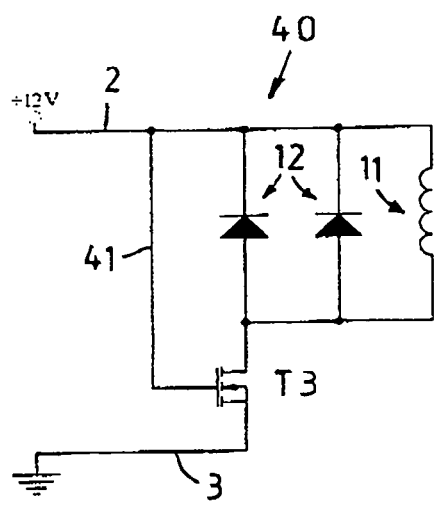
FIG. 3 shows an electronic circuit for each coil of an electromagnetic actuator in accordance with a second example embodiment.

FIGS. 2 and 3 show example embodiments which require retrofitting of all the electromagnetic valves used in the underground energy supply systems and can be embodied by means of the associated protective circuit 30 or 50 in accordance with the invention. In both example embodiments the description is simplified by representing the coil as the only component (reference 11) of the electromagnetic actuators of the electrohydraulic valves. Two freewheeling diodes in parallel with the coil 11 are given the reference number 12, and the +12 V potential of a power supply is indicated by reference 2 and the earth potential by reference 3.

In the example embodiment in FIG. 2 a protective circuit 30 comprises a field-effect transistor T2 in the form of a semiconductor switch having its gate connected to the output of a comparator 31 in a detecting circuit 32 connected in parallel with the coil 11, in order to detect a potential reversal at the coil 11 via the comparator thresholds set by the series resistors R6 and R7. On detection of the potential reversal or of an excessive potential change due to a potential change at the inputs of the comparator 31, the transistor T2 is so connected that it isolates the earth connection of the coil 11 from the earth potential 3 of the power system. Even if the coil 11 is briefly uncoupled from the power supply, the energy supply to the comparator 31 of the detecting circuit 32 is ensured by a buffer energy storage in the form of a capacitor C2, wherein the capacitor C2, protected by Zener diodes 33, 34 and a series resistor R5, is charged whenever voltage is applied to the coil 11. The capacitor C2 maintains the switching state of the comparator 31 in spite of the absence of voltage from the external supply, thus ensuring that the inductive load of the coil 11 is isolated from the ground potential 3. The inductive load of the coil 11 is then dissipated in known manner via the short-circuit means in the form of the freewheeling diodes 12.

FIG. 3 shows a further simplified protective circuit 40, as before comprising a field effect transistor T3 in the form of a semiconductor switch connected in series with the packet comprising a coil 11 and parallel-connected freewheeling diodes 12 and inserted between the earth potential 3 and the earth connection of the packet comprising the coil 11 and the freewheeling diode 12. If the earth potential is externally switched off, the coil 11 begins to discharge. This occurs via the freewheeling diodes 12. Owing to the voltage drop via the freewheeling diodes 12, the voltage at the earth-potential side of the coil becomes greater than the voltage at the 12 V side of the coil. Since the switched-through N channel of the field effect transistor T3 is no longer at zero potential since the earth connection has been cut off, the voltage at the drain and source contacts of the transistor T3 is raised to the electric potential at the said side of the coil 11, which is greater than the 12 V supply. Since the gate voltage of the transistor T3 is connected by the line to the 12 V potential 2, the transistor T3 automatically cuts off the current, that is disconnects the coil 11 from the earth potential 3, so that the energy stored in the coil 11 cannot reach the other connections of the solenoid valve.

Numerous modifications of the preceding description present themselves to a man skilled in the art and should be included within the scope of protection of the accompanying claims. Instead of field-effect transistors (FET), normal NPN transistors or the like can be used. The potential voltages mentioned in the description are only examples normally applying under the conditions of German underground mining. The current-limiting circuit can also be embodied in numerous other ways. The same applies to the production of the reference voltage, which could more precisely be set by a reference voltage regulator such as a Zener diode.

The invention claimed is:

1. A protective circuit comprising:
a plurality of intrinsically safe electromagnetic actuators for switching electro-hydraulic valves in underground mining;
a power supply approved for underground mining;
each of said intrinsically safe electromagnetic actuators comprising:
a coil connected to a first potential of the power supply;
at least two spaced-apart short-circuit means connected in parallel with the electromagnetic actuator coil for short-circuiting the coil in the event of a reversal of the potential of the coil voltage;
a semiconductor switch connected in series between the coil and a second potential of the power supply, said semiconductor switch also connected in series with the short-circuit means between the first and second power supply potentials;
a biasing means for providing a bias to the semiconductor switch to render the switch normally conductive; and
a detecting circuit comprising a comparator having a pair of input terminals connected in parallel with the coil for detecting a potential reversal across the coil, the comparator having an output terminal coupled to the semiconductor switch to cause the semiconductor switch to become non-conductive to isolate the coil and the short-circuit means from the second potential in the event of a reversal of the potential across the coil.

2. The protective circuit according to claim 1, in which the semiconductor switch is a transistor, especially a field-effect transistor, having its base or gate connected to the biasing means.

3. The protective circuit according to claim 1, wherein in the event of a potential reversal at the inputs of the comparator, the semiconductor switch is actuated in order to isolate the coil from the second potential.

4. The protective circuit according to claim 2, in which the semiconductor switch is a transistor, especially a field-effect transistor, having its base or gate connected to the output of the operational amplifier.

5. The protective circuit according to claim 1, in which a separate energy supply for the detecting circuit in the form of an energy buffer storage which is charged when the coil is energized at the power supply voltage.

6. The protective circuit according to claim 5, in which the energy buffer storage comprises a capacitor.

7. The protective circuit according to claim 1, in which the second potential is earth potential.

8. The protective circuit according to claim 1, in which the short-circuit means comprises freewheeling diodes.

9. A protective circuit for intrinsically safe underground energy supply systems comprising:
a plurality of intrinsically safe electromagnetic actuators;
a common power supply approved for underground mining;
a plurality of electronic control units connected to the supply lines of the common power supply for actuating respective electromagnetic actuators connected to the control units and operating at the power supply voltage for switching electro-hydraulic valves in underground mining;
each electromagnetic actuator comprising:
a coil connected to a first potential of the power supply;
at least one short-circuit means connected in parallel with each coil for short-circuiting the coil in the event of a reversal of the coil potential;
a semiconductor switch which is connected in series between the coil and a second potential of the power supply, said semiconductor switch also connected in series with the at least one short-circuit means and the second potential of the power supply,
a biasing means for providing a bias to the semiconductor switch to render the switch normally conductive; and
a detecting circuit comprising a comparator with a pair of input terminals connected in parallel with the coil for detecting a potential reversal across the coil, the comparator having an output terminal coupled to the semiconductor switch to cause the semiconductor switch to become non-conductive to isolate the coil and the short circuit means from the second potential in the event of a reversal of the potential across the coil.

10. The protective circuit according to claim 9, in which the semiconductor switch is connected to a voltage of a capacitor or a like chargeable with the power-supply voltage, so as to maintain the voltage difference necessary for switching the semiconductor switch in the event of a potential reversal at one of the coils.

11. The protective circuit according to claim 9, in which a current-limiting circuit associated with each control unit.

12. The protective circuit according to claim 10, in which the current-limiting circuit comprises a monitoring circuit which, if a set amperage is reached, actuates the or a semiconductor switch in order to isolate all coils from the second potential.

13. The protective circuit according to claim 11, in which the comparator, in the event of a reversal in the potential at the inputs of the comparator, actuates the semiconductor switch in order to cut off the voltage and current supply to all coils.

14. The protective circuit according to claim 9, in which the semiconductor switch is a transistor, especially a field-effect transistor.

15. The protective circuit according to claim 13, in which the output of the comparator and a capacitor are connected to the base or the gate of the semiconductor switch.

* * * * *